United States Patent
Chen et al.

(10) Patent No.: US 10,684,624 B2
(45) Date of Patent: Jun. 16, 2020

(54) SELF-NAVIGATING AND OBJECT-LIFTING CLEANING DEVICE

(71) Applicant: CLOUD NETWORK TECHNOLOGY SINGAPORE PTE. LTD., Singapore (SG)

(72) Inventors: Po-Cheng Chen, New Taipei (TW); Yu-Wen Chen, New Taipei (TW); Kuang-Yu Liu, New Taipei (TW); Ling-Chieh Tai, New Taipei (TW); Wei-Chun Chen, New Taipei (TW)

(73) Assignee: Cloud Network Technology Singapore Pte. Ltd., Singapore (SG)

( * ) Notice: Subject to any disclaimer, the term of this patent is extended or adjusted under 35 U.S.C. 154(b) by 285 days.

(21) Appl. No.: 15/271,239

(22) Filed: Sep. 21, 2016

(65) Prior Publication Data
US 2018/0046197 A1 Feb. 15, 2018

(30) Foreign Application Priority Data
Aug. 11, 2016 (CN) .......................... 2016 1 0655329

(51) Int. Cl.
| | |
|---|---|
| A47L 9/00 | (2006.01) |
| G05D 1/02 | (2020.01) |
| B25J 5/00 | (2006.01) |
| B25J 19/02 | (2006.01) |
| B25J 11/00 | (2006.01) |
| B25J 9/00 | (2006.01) |

(52) U.S. Cl.
CPC .......... *G05D 1/0246* (2013.01); *A47L 9/009* (2013.01); *B25J 5/007* (2013.01); *B25J 9/0087* (2013.01); *B25J 11/0085* (2013.01); *B25J 19/022* (2013.01); *B25J 19/023* (2013.01); *G05D 1/0242* (2013.01); *G05D 1/0255* (2013.01); *G05D 2201/0215* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,646,630 | A * | 3/1972 | Russell | A47L 1/02 15/103 |
| 4,934,017 | A * | 6/1990 | Kent | A47L 5/365 15/321 |
| 2005/0273967 | A1 * | 12/2005 | Taylor | A47L 5/28 15/319 |
| 2014/0205403 | A1 * | 7/2014 | Criswell | B25J 5/007 414/395 |
| 2016/0158942 | A1 * | 6/2016 | Augenbraun | B25J 9/1694 700/253 |

FOREIGN PATENT DOCUMENTS

CN 204445701 U 7/2015

\* cited by examiner

*Primary Examiner* — Adam D Tissot
*Assistant Examiner* — Edward J Pipala
(74) *Attorney, Agent, or Firm* — ScienBiziP, P.C.

(57) ABSTRACT

A self-navigating cleaning device with obstacle-removing capabilities includes a detecting unit to detect the environment, and a driving unit to receive the driving signal from a navigation control unit and drive the cleaning device to move according to the driving signal. A floor cleaning unit cleans the floor automatically during movement of the cleaning device.

11 Claims, 4 Drawing Sheets

SELF-NAVIGATING AND OBJECT-LIFTING CLEANING DEVICE

FIELD

The subject matter herein generally relates to cleaning devices.

BACKGROUND

Automatic cleaning tools, such as vacuum cleaners, are configured to clean up the home. In general, the automatic cleaning tool always requires artificial auxiliary operation.

BRIEF DESCRIPTION OF THE DRAWINGS

Implementations of the present technology will now be described, by way of example only, with reference to the attached figures.

DETAILED DESCRIPTION

Figure 1:
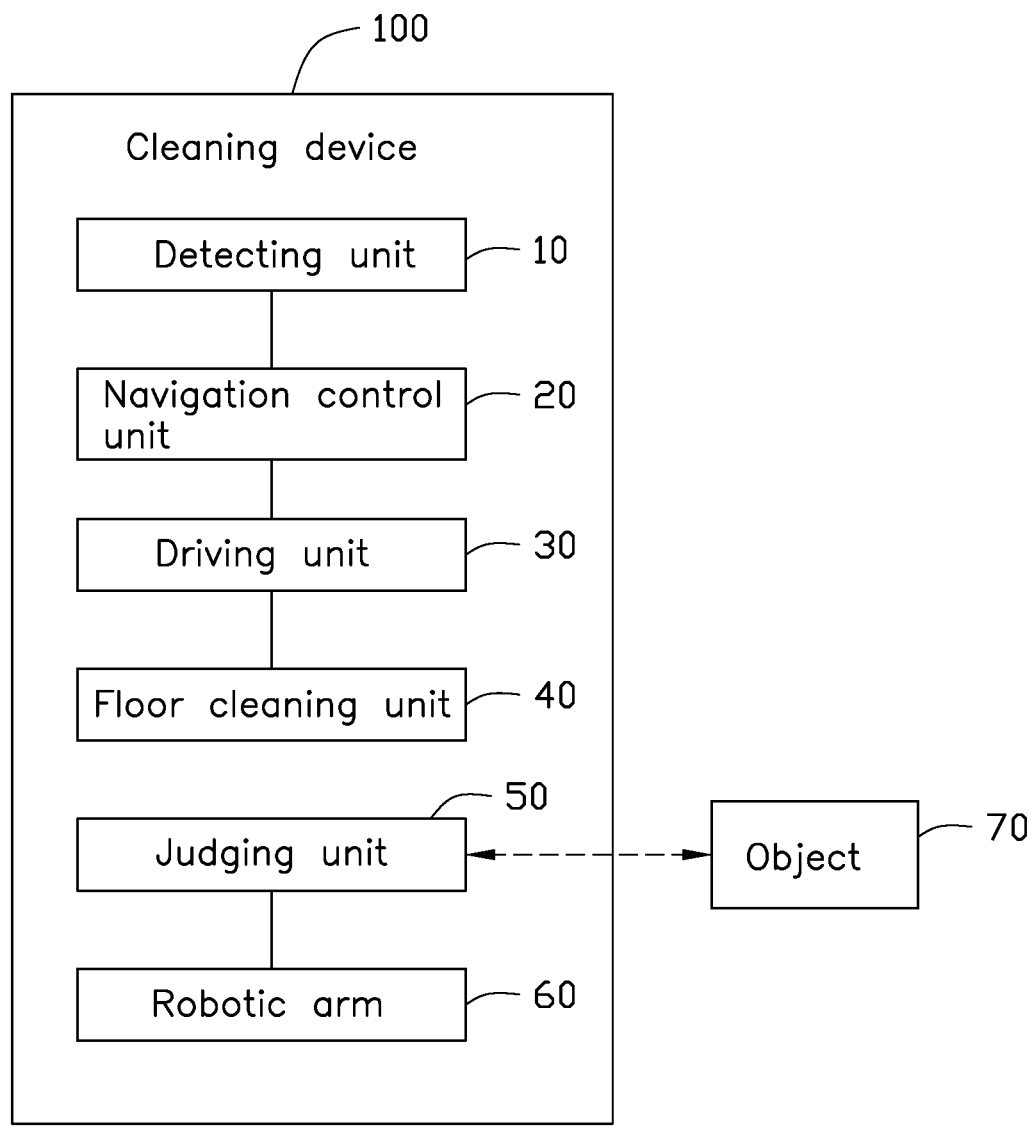
FIG. 1 is a block diagram of an embodiment of a cleaning device with a judging unit of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

FIG. 1 illustrates a cleaning device 100 of an embodiment of the present disclosure.

The cleaning device 100 can comprise a detecting unit 10, a navigation control unit 20, a driving unit 30, a floor cleaning unit 40, a judging unit 50, and a robotic arm 60. The detecting unit 10 is electrically coupled to the navigation control unit 20. The navigation control unit 20 is electrically coupled to the driving unit 30.

The detecting unit 10 is configured to detect the environment of the cleaning device 100 and output a navigation information. For example, the detecting unit 10 detects whether the cleaning device 100 is close to an object 70. In at least one embodiment, the detecting unit 10 can be an ultrasonic sensor or an infrared sensor.

The navigation control unit 20 is configured to receive the navigation information and output a driving signal according to the navigation information.

The driving unit 30 is configured to receive the driving signal and drive the cleaning device 100 to move according to the driving signal.

The floor cleaning unit 40 is configured to clean the floor automatically during the movement of the cleaning device 100.

In at least one embodiment, the floor cleaning unit 40 can be a vacuum cleaner.

The judging unit 50 is configured to determine whether the object 70 detectable by the cleaning device 100 is a transparent object.

The robotic arm 60 is configured to clean up to the object 70.

Figure 2:
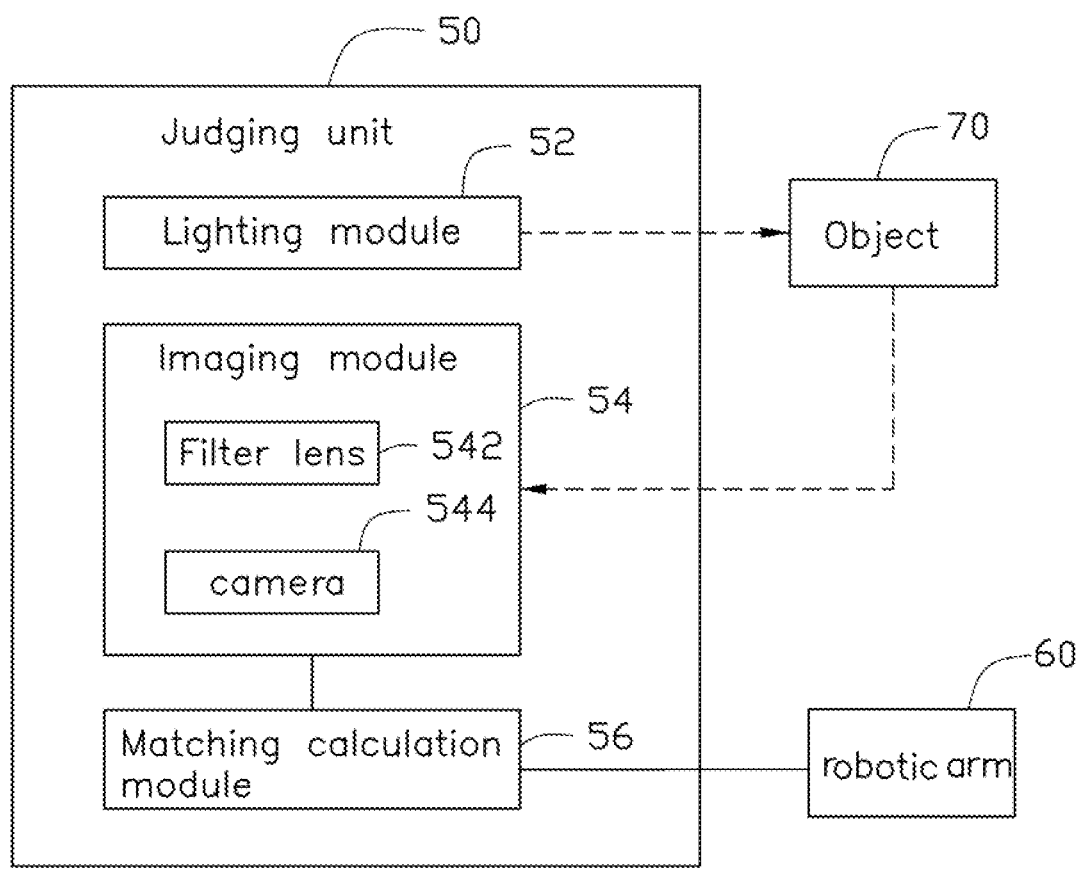
FIG. 2 is a block diagram of the judging unit of FIG. 1.
Figure 3:
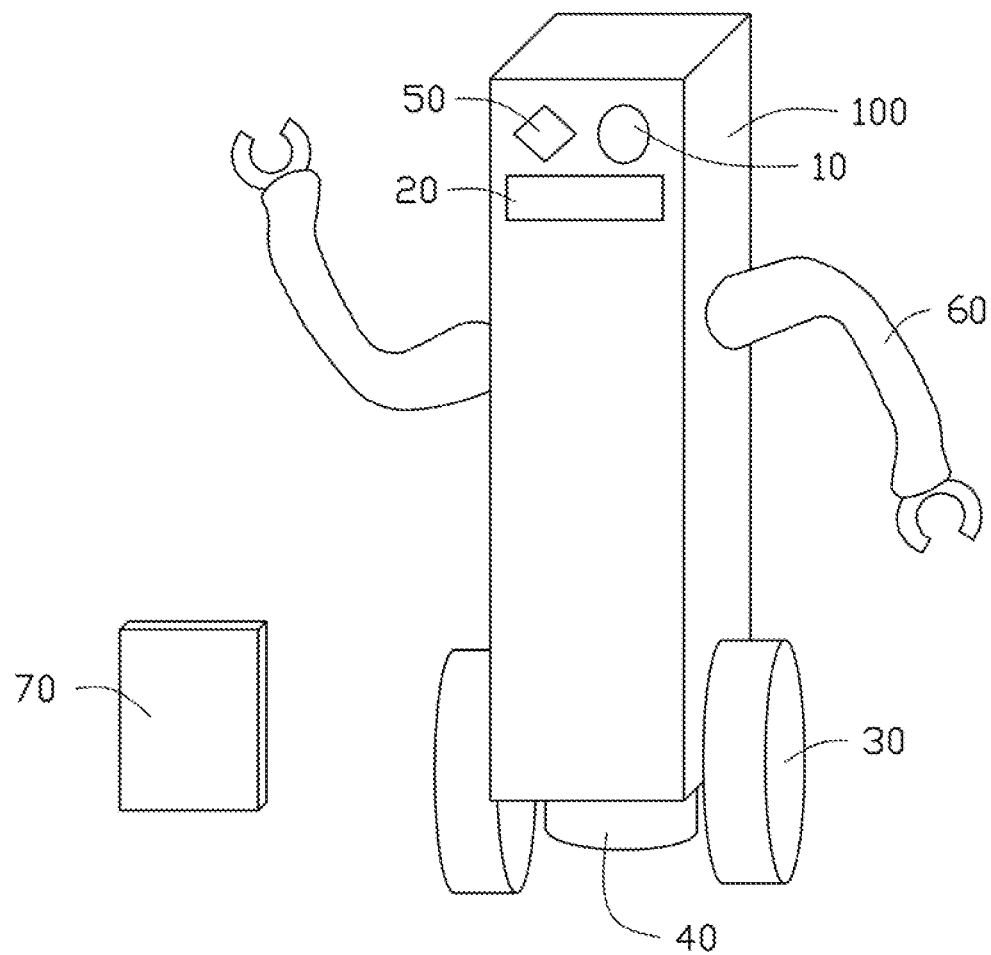
FIG. 3 is a view of an embodiment of the cleaning device of FIG. 1.

FIGS. 2 and 3 illustrates the judging unit 50 of an embodiment of the present disclosure.

The judging unit 50 can comprise a lighting module 52, an imaging module 54, and a matching calculation module 56.

The lighting module 52 is configured to emit light to illuminate one or more objects 70. The lighting module 52 can comprise a plurality of luminous elements. In at least one embodiment, each luminous element can be a light emitting diode (LED).

The imaging module 54 is electrically coupled to the matching calculation module 56. The imaging module 54 is configured to obtain image information from the object 70 and transmit the image information to the matching calculation module 56. The imaging module 54 can comprise a filter lens 542 and a camera 544. The filter lens 542 is configured to filter out scattering light. The camera 544 is configured to capture images.

The matching calculation module 56 is configured to obtain the image information from the imaging module 54, and determine whether the object 70 is a transparent object.

The matching calculation module 56 determines whether the image information transmitted by the imaging module 54 is a light reflection. If the image information transmitted by the imaging module 54 is a light reflection, the matching calculation module 56 outputs a control signal to the robotic arm 60.

The robotic arm 60 obtains the control signal from the matching calculation module 56, and cleans up to the object 70 according to the control signal transmitted by the matching calculation module 56.

Figure 4:
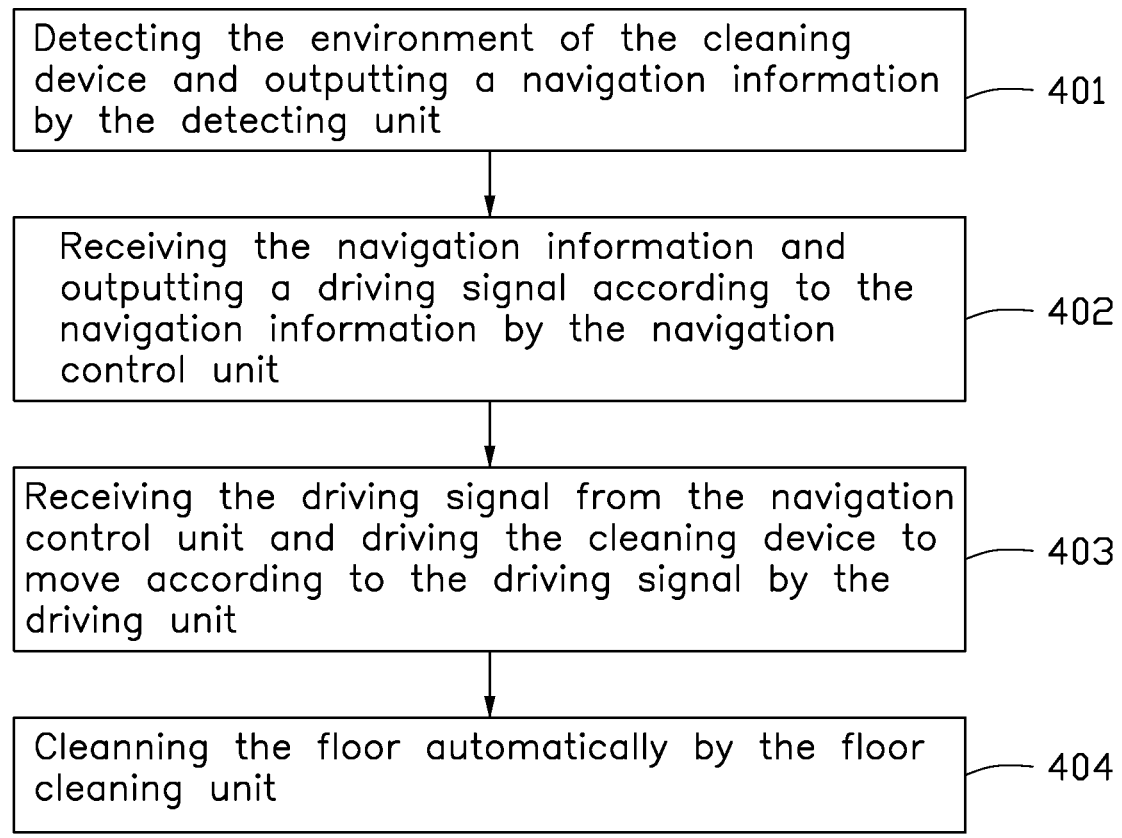
FIG. 4 a flowchart depicting an embodiment of a cleaning method.

FIG. 4 illustrates a flowchart depicting an exemplary embodiment of a cleaning method. At block 401, the detecting unit 10 detects the environment of the cleaning device 100 and outputs a navigation information. At block 402, the navigation control unit 20 receives the navigation information and outputs a driving signal according to the navigation information. At block 403, the driving unit 30 receives the driving signal from the navigation control unit 20 and drives the cleaning device 100 to move according to the driving signal. The driving unit 30 includes a motor (not shown), the motor driving a wheel to move according to the driving signal. At block 404, the floor cleaning unit 40 cleans the floor automatically as the cleaning device 100 moves.

When the detecting unit 10 detects an object 70 in the environment of the cleaning device 100, the matching calculation module 56 determines whether the object 70 is a transparent object.

When the matching calculation module 56 determines the object 70 is a transparent object, the matching calculation module 56 outputs the control signal to the robotic arm 60, the robotic arm 60 cleans up to the object 70 according to the control signal transmitted by the matching calculation module 56.

The embodiments shown and described above are only examples. Many details are often found in the art such as the other features of cleaning device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A cleaning device comprising:
   detecting unit configured to detect a surrounding environment of the cleaning device and output navigation information;
   a navigation control unit in data communication with the detecting unit and configured to receive the navigation information and output a driving signal to a driving unit according to the information transmitted by the detecting unit;
   the driving unit in data communication with the navigation control unit and configured to receive the driving signal and drive the cleaning device to move according to the driving signal; and
   a floor cleaning unit configured to clean the floor automatically as the cleaning device moves according to the driving signal;
   wherein the cleaning device further comprises a judging unit, when the detecting unit detects an object in the surrounding environment of the cleaning device, the judging unit determines whether the object is a transparent object;
   wherein the judging unit comprises a lighting module and an imaging module, the lighting module is configured to emit light to the object, the imaging module is configured to obtain image information from the object; and
   wherein the judging unit further comprises a matching calculation module, the matching calculation module determines whether the image information transmitted by the imaging module is a light reflection.

2. The cleaning device of claim 1, wherein the detecting unit is an ultrasonic sensor.

3. The cleaning device of claim 1, wherein the detecting unit is an infrared sensor.

4. The cleaning device of claim 1, wherein the lighting module comprises a plurality of luminous elements, each of the luminous elements is a light emitting diode (LED).

5. The cleaning device of claim 1, wherein the cleaning device further comprises a robotic arm, when the image information transmitted by the imaging module is a light reflection, the matching calculation module outputs a control signal to the robotic arm, the robotic arm obtains the control signal from the matching calculation module, and cleans up the object according to the control signal transmitted by the matching calculation module.

6. The cleaning device of claim 1, wherein the floor cleaning unit is a vacuum cleaner.

7. A cleaning device comprising:
   a robotic arm;
   a detecting unit configured to detect a surrounding environment of the cleaning device and output information;
   a navigation control unit in data communication with the detecting unit and configured to receive the information and output a driving signal to a driving unit according to the information transmitted by the detecting unit;
   the driving unit in data communication with the navigation control unit and configured to receive the driving signal and drive the cleaning device to move according to the driving signal;
   a floor cleaning unit configured to clean the floor automatically as the cleaning device moves in accordance with the driving signal; and
   a judging unit coupled to the robotic arm and configured to determine whether an object in the surrounding environment of the cleaning device is a transparent object;
   wherein when the judging unit determines the object is a transparent object, the judging unit outputs a control signal to the robotic arm, the robotic arm obtains the control signal from the judging unit, and cleans up the object according to the control signal transmitted by the judging unit;
   wherein the judging unit comprises a lighting module and an imaging module, the lighting module is configured to emit light to the object, the imaging module is configured to obtain image information from the object; and
   wherein the judging unit further comprises a matching calculation module, the matching calculation module determines whether the image information transmitted by the imaging module is a light reflection.

8. The cleaning device of claim 7, wherein the detecting unit is an ultrasonic sensor.

9. The cleaning device of claim 7, wherein the detecting unit is an infrared sensor.

10. The cleaning device of claim 7, wherein the lighting module comprises a plurality of luminous elements, each of the luminous elements is a light emitting diode (LED).

11. The cleaning device of claim 7, wherein the floor cleaning unit is a vacuum cleaner.

* * * * *